US010404971B2

United States Patent
Braune (10) Patent No.: US 10,404,971 B2
(45) Date of Patent: Sep. 3, 2019

(54) OPTOELECTRONIC SENSOR AND METHOD FOR SAFE DETECTION OF OBJECTS OF A MINIMUM SIZE

(71) Applicant: SICK AG, Waldkirch (DE)

(72) Inventor: Ingolf Braune, Waldkirch (DE)

(73) Assignee: SICK AG, Waldkich (DE)

( * ) Notice: Subject to any disclaimer, the term of this patent is extended or adjusted under 35 U.S.C. 154(b) by 276 days.

(21) Appl. No.: 15/376,873

(22) Filed: Dec. 13, 2016

(65) Prior Publication Data

US 2017/0214902 A1 Jul. 27, 2017

(30) Foreign Application Priority Data

Jan. 26, 2016 (EP) .................................... 16152709

(51) Int. Cl.
*G05B 19/406* (2006.01)
*G06K 9/00* (2006.01)
*G06T 7/50* (2017.01)
*G01B 11/22* (2006.01)
*G01B 11/24* (2006.01)
(Continued)

(52) U.S. Cl.
CPC .......... *H04N 13/271* (2018.05); *G01B 11/22* (2013.01); *G01B 11/24* (2013.01); *G05B 19/406* (2013.01); *G06K 9/00201* (2013.01); *G06K 9/00362* (2013.01); *G06K 9/00771* (2013.01); *G06T 7/50* (2017.01); *H04N 13/239* (2018.05); *G05B 2219/34306* (2013.01);
(Continued)

(58) Field of Classification Search
CPC .......... H04N 13/0271; H04N 13/0239; G01B 11/22; G01B 11/24; G06K 9/00362; G06K 9/00201; G06T 7/50; G06T 2207/10012; G06T 2207/30196; G05B 19/406; G05B 2219/34306
USPC ......................................................... 348/152
See application file for complete search history.

(56) References Cited

U.S. PATENT DOCUMENTS 8,830,224 B2 * 9/2014 Zhao ........................ G06T 11/00
345/419
2006/0227316 A1 * 10/2006 Gatt ........................ G01S 7/4811
356/5.09
2010/0034476 A1 * 2/2010 Kido .................... G06K 9/6203
382/243
(Continued)

FOREIGN PATENT DOCUMENTS

EP 2426576 A2 3/2012
EP 2275990 B1 9/2012
(Continued)

OTHER PUBLICATIONS

European Search Report dated Sep. 19, 2016 corresponding to application No. 16152709.8-1901.

*Primary Examiner* — Zaihan Jiang
(74) *Attorney, Agent, or Firm* — Nath, Goldberg & Meyer; Jerald L. Meyer; Tanya E. Harkins (57) ABSTRACT

An optoelectronic sensor (10) for safe detection of objects (32, 34) of a minimum size in a monitoring area (12), the sensor (10) having an image sensor (16*a-b*) for acquiring image data of the monitoring area (12) and an evaluation unit (24) configured to detect, in the image data, both finely detected objects (34, 36) with a fine detection capability and coarsely detected objects (32) with a coarse detection capability, the coarse detection capability being coarser than the fine detection capability, and to ignore finely detected objects (36) which are not in a vicinity (38) of a coarsely detected object (32).

20 Claims, 3 Drawing Sheets

(51) Int. Cl.
*H04N 13/271* (2018.01)
*H04N 13/239* (2018.01)

(52) U.S. Cl.
CPC ............. *G06T 2207/10012* (2013.01); *G06T 2207/10028* (2013.01); *G06T 2207/30196* (2013.01)

(56) References Cited

U.S. PATENT DOCUMENTS

| | | | |
|---|---|---|---|
| 2010/0079448 A1* | 4/2010 | Chen | G06T 17/00 345/419 |
| 2011/0001658 A1* | 1/2011 | Noble | G01S 5/04 342/107 |
| 2011/0001799 A1* | 1/2011 | Rothenberger | G06K 9/00771 348/47 |
| 2012/0327190 A1* | 12/2012 | Massanell | B25J 9/1676 348/46 |
| 2013/0120588 A1* | 5/2013 | Omprakash | G06K 9/3233 348/184 |
| 2014/0184912 A1* | 7/2014 | Omprakash | G09G 5/003 348/564 |
| 2015/0010208 A1* | 1/2015 | Phan | H04W 24/00 382/103 |
| 2016/0148069 A1* | 5/2016 | Song | H04N 13/20 348/46 |
| 2017/0032220 A1* | 2/2017 | Medasani | G06T 7/74 |
| 2018/0204090 A1* | 7/2018 | Konishi | G06K 9/6202 |

FOREIGN PATENT DOCUMENTS

| | | |
|---|---|---|
| EP | 2708981 A2 | 3/2014 |
| EP | 2819109 A1 | 12/2014 |

* cited by examiner

OPTOELECTRONIC SENSOR AND METHOD FOR SAFE DETECTION OF OBJECTS OF A MINIMUM SIZE

FIELD

The invention relates to an optoelectronic sensor and a method for safe detection of objects of a minimum size.

BACKGROUND

The optoelectronic sensor acquires an image of a monitoring area in order to detect and evaluate objects therein. In principle, any conventional camera suffices, but the following specification mainly deals with 3D sensors. These include 3D cameras of various technologies, such as stereoscopy, triangulation, light time of flight, and with evaluation of variations of passive two-dimensional patterns or projected illumination patterns. 3D sensors, in contrast to a conventional camera, take images which include a distance value in their pixels. The depth-resolved or three-dimensional image data are also referred to as depth maps. Furthermore, laser scanners scanning in two or all three directions are known which also detect three-dimensional image data via the respective scanning angle and the measured distance. The higher device and evaluations costs for generating three-dimensional image data as compared to two-dimensional image acquisition is justified in many applications by the additional information.

One specific field of application is safety technology, where the sensor is used as a protective device to detect a state within the monitored area classified as critical, which leads to a warning or a shutdown of a source of danger. Safety technology has specific requirements because health or even life of persons depends on the correct operation of the sensor.

In particular in the field of safety technology, but in principle in any visual monitoring, image defects are problematic because the sensor is partially blind. Therefore, great efforts are made to obtain a high-quality image as a starting point. A simple example of these image defects is a local glare of a gloss reflection.

For stereo cameras, an active illumination is used to project a pattern into the monitoring area, which is to provide a reliable structure independent of the scene. The goal is to generate so-called dense depth maps by various algorithms, i.e. depth maps containing a valid distance value possibly for all pixels. The respective algorithm tries to match the pattern in a window of the one image with the other image. This is generally possible. However, the disparity can sometimes not be determined, or not be determined with sufficient reliability. The reason for example is insufficient quality of the pattern element in the image, such as due to unfavorable remission properties of the respective surface in the scene so that there is a loss of pattern structures which are the prerequisite of the correlation. In these cases, the respective depth value cannot be determined, and there remains an image defect, a so-called gap in the depth map.

From a safety-technical point of view, gaps must be considered as possible objects or object components as a precaution. However, this can severely reduce the availability because safety-related shutdowns are triggered by gaps rather than real objects.

In safety-related applications, it is typically required that an object with certain minimum dimensions is reliably detected. This property is called detection capability. As long as a relatively coarse detection capability is used, the objects to be detected are larger than the gaps, and the simple approach of treating gaps like objects or parts of objects does not affect the availability. However, a coarse detection capability leads to large safety margins and thus makes cooperation of man and machine more difficult by large distances throughout the day. There is therefore a need for a finer detection capability which enables considerably smaller safety margins. If in turn improved object detection with a finer detection capability simply treats gaps as objects, the impact of misdetections on the availability becomes apparent because gaps can no longer be distinguished from objects by their size.

In EP 2 275 990 B1, there is a twofold evaluation, namely whether there are critical gaps or connected pixel areas without gaps which are respectively larger than the smallest object to be detected. This implies nothing else but treating gaps like objects, with the adverse effects on the availability as described.

EP 2 819 109 A1 discloses a 3D sensor which detects objects of a minimum size and larger in a detection field. In order to correctly take into account the projective geometry of a stereo camera, areas of the depth map are compared with suitably selected templates. Gaps are also treated like objects, so that the problem of more frequent unnecessary shutdowns at finer detection capability remains.

SUMMARY

It is therefore an object of the invention to increase the detection capability of an optoelectronic sensor while having as little impact on the availability as possible.

This object is satisfied by an optoelectronic sensor for safe detection of objects of a minimum size in a monitoring area, the sensor having an image sensor for acquiring image data of the monitoring area and an evaluation unit configured to detect, in the image data, both finely detected objects with a fine detection capability and coarsely detected objects with a coarse detection capability, the coarse detection capability being coarser than the fine detection capability, and to ignore finely detected objects which are not in a vicinity of a coarsely detected object.

The object is also satisfied by a method for safe detection of objects of a minimum size in a monitoring area, wherein image data is acquired and evaluated to detect, in the image data, both finely detected objects with a fine detection capability and coarsely detected objects with a coarse detection capability, the coarse detection capability being coarser than the fine detection capability, and wherein finely detected objects which are not in a vicinity of a coarsely detected object are ignored.

The invention starts from the basic idea that small objects can only be relevant in a spatial proximity to a large object. Therefore, there is a double evaluation of image data acquired by an image sensor with a fine detection capability and a coarse detection capability. As an intermediate step, so-called finely detected objects resulting from the evaluation with the fine detection capability and coarsely detected objects resulting from the evaluation with the coarse detection capability are obtained. Then, finely detected objects which are not in a vicinity of a coarsely detected object are ignored. It is assumed that such isolated finely detected objects are image defects.

As usual in the art, detection capability refers to a minimum size of objects which are safely detected, for example defined in millimeters. The achievable detection capability depends on the optical resolution, but also on the evaluation method. It should be noted that of course the detection with fine detection capability also reveals the larger object of the detection with coarse detection capability a second time. In this respect, the detection with fine detection capability does not provide any new aspects. The invention aims at dealing with small objects which are only detected as finely detected objects.

The invention has the advantage that the fine detection capability can be used, and safety margins can be selected accordingly. Due to the increased detection capability, there are additional critical regions, not only from objects which can only be detected with the increased detection capability as desired, but also from more image defects which cannot any longer be excluded solely by their size. According to the invention, the system availability still is high, because small misdetections or errors are intelligently eliminated. This is done based on the rule that relevant small objects in safety applications for the protection of persons are tied to the presence of a person in the vicinity.

The evaluation unit is preferably configured to form a common object from a coarsely detected object and finely detected objects in its vicinity. Throughout this specification, the terms preferably or preferred refer to advantageous, but optional features. The finely detected objects are thus added to a close, coarsely detected object. The resulting object or a circumscribed contour such as a rectangle is then treated as a common object. An illustrative example is a body as a coarsely detected object and a hand in its vicinity as a finely detected object, which are combined.

The sensor preferably is a 3D camera which detects a depth map as image data by means of its image sensor. The 3D camera may use any known technique, such as light time of flight or light section method. In this specification, a stereo camera is often considered as a preferred example, which either correlates two camera images with each other or a camera image with a known projection pattern, and which estimates disparities. If the correlation is not possible in a region, there are pixels without depth value or gaps. The other 3D methods also have effects causing gaps in the depth maps.

The fine detection capability preferably enables leg detection, arm detection, hand detection, or finger detection, and the coarse detection capability preferably enables body detection, leg detection, or arm detection. Not all combinations are possible, but only those where the fine detection capability detects the smaller body part. For example, there may be an embodiment where the coarse detection capability enables leg detection, while in another embodiment only the fine detection capability detects legs.

The fine detection capability is preferably 14 mm, 20 mm, 40 mm, or 55 mm, and the coarse detection capability is preferably 70 mm, 120 mm, 150 mm, or 200 mm. The respective boundary between fine and coarse is purely exemplary.

The evaluation unit, when locating finely detected objects in the vicinity of a coarsely detected object, preferably at first defines a circumscribing geometric shape for the coarsely detected object and then determines a search area with a specified distance around the geometric shape as the vicinity. The specified distance is also referred to as a search radius. Due to the circumscribing geometric shape, the search becomes independent of the precise object contour, and the vicinity can be determined very easily by the specified distance. As an example, the circumscribing geometric shape may be a rectangle, with the search area being a centered rectangle which is larger in correspondence with the specified distance. This is analogous for geometries other than a rectangle, while the circumscribing geometric shape and the search area not necessarily have the same geometry.

As a preferred alternative, the evaluation unit, when locating finely detected objects in the vicinity of a coarsely detected object, places a mask having a geometric shape with the size of a specified distance at each image pixel of the coarsely detected object, and thus the sum of the masks determines the vicinity. The sum of the masks is for example obtained by an OR operation in a binary map. This may be seen as a local approach, which forms the search area from pixel to pixel, while the approach explained in the previous paragraph is one-step based on the circumscribing geometric shape. The trade-off is that the locally determined search range is more precisely adapted to the object contour. The specified distance or search radius is preferably the same for all masks, and also preferably corresponds to the one which would be used for a determination based on the circumscribing geometric shape.

The geometric shape is preferably a circle, a rectangle, a hexagon, or another polygon. The different shapes each have advantages in terms of processing and accuracy.

The specified distance is preferably derived from safety margins in dependence on the detection capability as defined in safety standards. Currently, the relevant standards are ISO 13855 and IEC 61496-4-3. Depending on the legal framework, the corresponding standard of another application, sensor, country, or a future standard replacing today's relevant standards has to be used.

The specified distance is preferably derived from a difference of the safety margin $C_1$ in dependence on the coarse detection capability minus the safety margin $C_2$ in dependence on the fine detection capability. The relevant standards specify the necessary safety distances. However, it can be shown that from all variables discussed in the standards, it suffices to use only these safety margins depending on the detection capability, which considerably simplifies the calculation.

The evaluation unit is preferably configured to evaluate whether a detected object is located within a predefined protection field or too close to a source of danger, and to output a safety-related shutdown signal via a safe output in this case. In this context, detected objects are only coarsely detected objects or finely detected objects in their vicinity, and no longer isolated, finely detected objects, which already have been revealed as image defects according to the invention. In case that such a detected object is in a dangerous position, a safety-related shutdown signal is to be provided at a safe output (OSSD, Outpus Signal Switching Device) for a reliable protection of persons.

The evaluation unit is preferably configured to evaluate different protection fields for the coarse detection capability and the fine detection capability in that the protection field is enlarged by a safety extension for the coarse detection capability. Classical protective field evaluation is also possible according to the invention. Then, larger objects are preferably located in a somewhat larger protection field. Otherwise, finely detected objects on the edge could not be ignored as isolated, because the test for a coarsely detected object in the vicinity is incomplete since it could be outside the protection field for finely detected objects. This is taken into account by the safety extension. Only protection field intrusions into the smaller protection field of the fine detection capability are critical, so that the advantage of smaller safety distances is maintained. The safety extension preferably is calculated from the safety margins for the fine and coarse detection capability and in particular as $r+C_1-C_2$, where $C_1$, $C_2$ are the safety margins and r is the specified distance for the search area mentioned above, which defines the vicinity of a coarsely detected object.

The inventive method can be modified in a similar manner and shows similar advantages. Further advantageous features are described in the sub claims following the independent claims in an exemplary, but non-limiting manner.

BRIEF DESCRIPTION OF THE DRAWINGS

The invention will be explained in the following also with respect to further advantages and features with reference to exemplary embodiments and the enclosed drawing. The Figures of the drawing show in.

DETAILED DESCRIPTION

Figure 1:
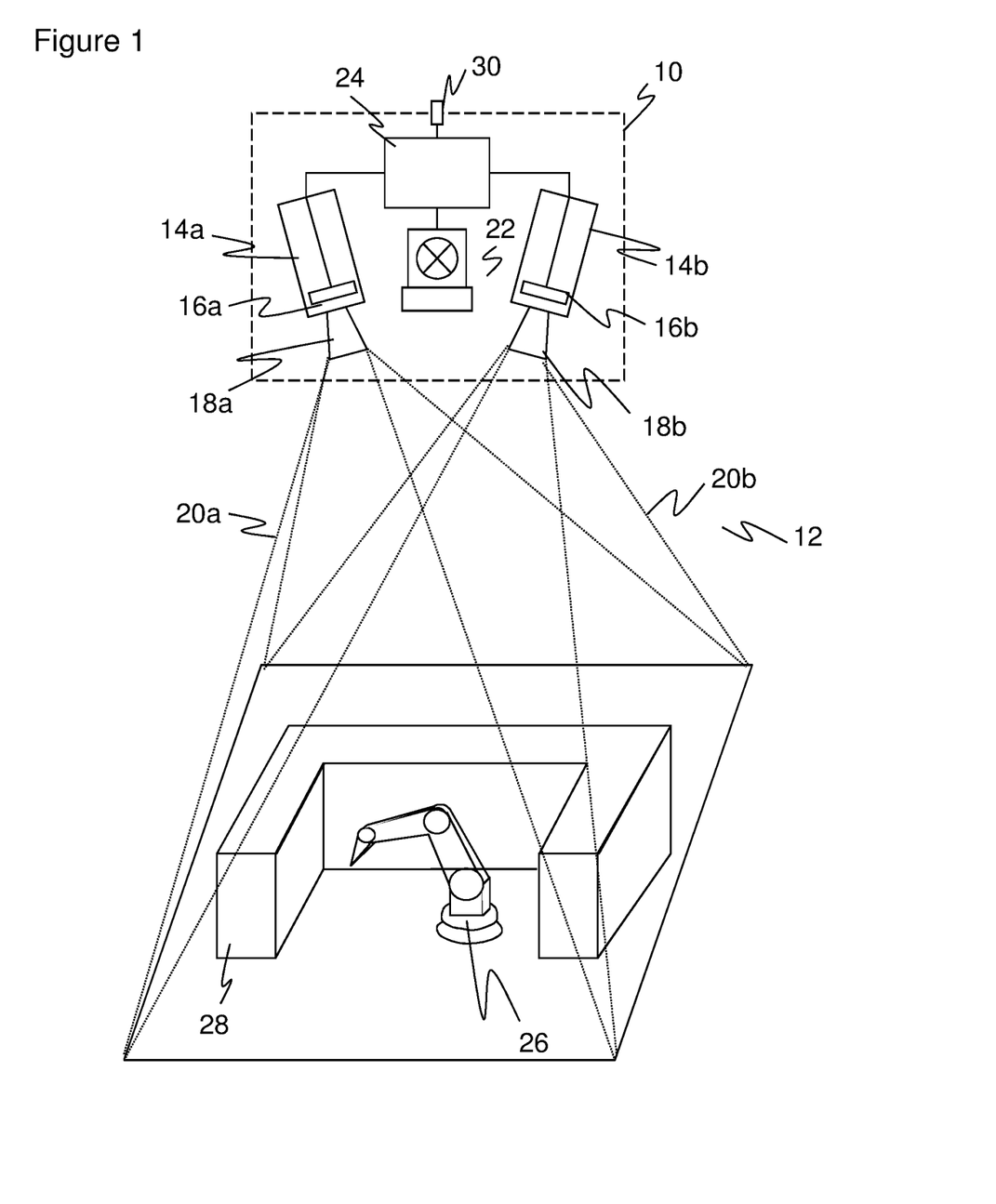
FIG. 1 a schematic three-dimensional representation of a 3D camera.

FIG. 1 shows the general structure of a stereo camera for acquiring a depth map in a schematic three-dimensional representation. Although the sensor 10 shown and described below is a stereo camera, the invention is not limited to a stereo camera. The object detection according to the invention can be used for any image acquisition, in particular for the other 3D cameras mentioned in the introduction determining light time of flight or evaluating variations of passive two-dimensional patterns or projected illumination patterns, as well as for laser scanners. The illustrated sensor 10 is mounted for an acquisition from above, which is often advantageous and also, in some passages in this specification, influences the language of the geometric relationships. Nevertheless, the sensor 10 may as well be mounted laterally, at the bottom or in any other static or mobile position and orientation.

For detecting a spatial area 12, two camera modules 14a, 14b are mounted at a known fixed distance to one another and acquire respective images of the spatial area 12. In each camera, an image sensor 16a, 16b is provided, usually a matrix-shaped acquisition chip which acquires a rectangular pixel image, for example a CCD sensor or a CMOS sensor. The two image sensors 16a, 16b together form a 3D image sensor for acquiring a depth map. An objective 18, 18b with imaging optics is arranged in front of each of the image sensors 16a, 16b, which in practice can be any known imaging objective. The maximum viewing angle of the optics is represented by dashed lines in FIG. 1, forming a respective viewing pyramid 20a, 20b.

An illumination unit 22 is provided between the two image sensors 16a, 16b in order to illuminate the spatial area 12 with a structured pattern. The stereo camera as shown is thus configured for active stereoscopy where the pattern provides contrasts that can be evaluated even in a scene which is inherently without structure. Alternatively, no illumination or a homogeneous illumination is provided in order to evaluate the natural object structures in the spatial area 12, but this generally results in additional image defects.

A control and evaluation unit 24 is connected to the two image sensors 16a, 16b and the illumination unit 22. The control and evaluation unit 24 can be implemented in various hardware, for example, an external standard computer, an internal digital device such as a microprocessor, an Application Specific Integrated Circuits (ASIC), a Field Programmable Gate Arrays (FPGA), a Graphics Processing Unit (GPU), or hybrids thereof. Since the generation of the depth map and its evaluation is computationally expensive, there is preferably an at least partially parallel architecture.

The control and evaluation unit 24 generates the structured illumination pattern by means of the illumination unit 22 and receives image data from the image sensors 16a, 16b. From these image data, it calculates the three-dimensional image data or the depth map of the spatial area 12 with stereoscopic disparity estimation. The overall spatial area 12, or the working area, can be limited in a configuration, for example to exclude interfering or unnecessary regions. The remaining working area is also called a configured workings area.

A prominent application of the sensor 10 in safety technology is the monitoring of a source of danger 26, which is symbolized by a robot in FIG. 1. Often, protection fields 28 are defined in the configured working area providing safety for the source of danger like a virtual wall. Alternatively, the position of the source of danger 26 is known in the control and evaluation unit 24, which evaluates whether there is a forbidden object within a safety distance from the source of danger 26. A forbidden intrusion into the protective field 28 or an object located too close to the source of danger 26 triggers a safety-related shutdown signal which is output via a safe output 30 (OSSD, Output Signal Switching Device) in order for example to stop or slow down the robot.

The sensor 10 is designed to be failsafe in safety-related applications. This may for example mean that the sensor 10 tests itself, in particular in cycles faster than a required response time, detects defects of the image sensors 16a-b or the illumination unit 22, or that the control and evaluation unit 24 and/or the output 30 is safe, for example by two-channel design, or uses self-checking algorithms. Such measures are standardized for general contactless protective devices in EN 61496-1 or IEC 61496 as well as in DIN EN ISO 13849 and EN 61508. A corresponding standard for safety cameras is in preparation. IEC/TS 61496-4-3 and ISO 13855 also define the outer limits of the protection fields 28 towards the worker as regards the distance from the source of danger 26.

Now, on the one hand, the sensor 10 is to detect objects with a fine detection capability in order to meet higher safety requirements like arm or even finger protection, and because then smaller safety distances are sufficient according to the standards. On the other hand, the fine detection capability leads to unnecessary shutdowns caused by gaps in the depth maps, and thus to a reduced availability.

The invention solves this double requirement of correctly handling gaps as relevant objects and nevertheless remaining available from the consideration that small objects embodying fingers, hands and arms cannot occur isolated in space. Rather, a large object defining the body must be in a spatial relationship with the small object. This does not necessarily imply a direct contact, i.e. it does not need to be a single object.

Figure 2:
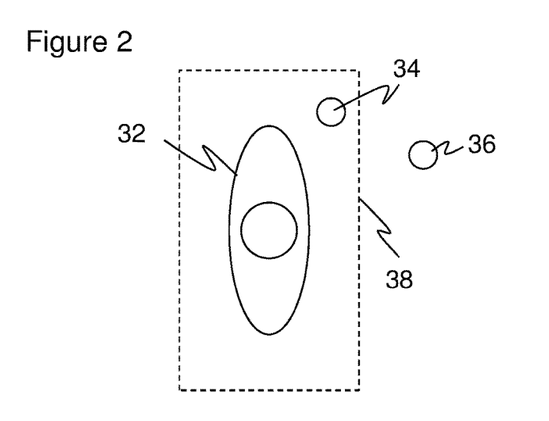
FIG. 2 a schematic representation of coarsely and finely detected objects as well as their classification according to the invention.

FIG. 2 illustrates the basic principle according to which small objects are relevant only in spatial proximity to a large object. The objects are detected with coarse and fine detection capability. The results are coarsely detected objects 32 and finely detected objects 34, 36. The terminology refers to the detection, not directly to the object size, and therefore coarsely and finely detected objects are not completely identical with large and small objects despite a strong similarity. For example, a large object of course is also detected with fine detection capability. On the other hand, in addition to the large objects which anyway are already revealed with coarse detection capability, the fine detection capability only adds relevant finely detected objects 34, 36, and thus ultimately small objects. The effective difference of the terms therefore is small.

In a vicinity 38 of the large object 32, all small objects 34 are now added to the large object 32, and all isolated or singular small objects 36 are ignored. Any singular small object 36 can only have been detected from erroneous data such as gaps in the depth map. The safe presence detection is or remains deactivated, although a consideration of the fine detection capability alone would require its triggering. There are relevant objects 34 and irrelevant objects 36 in the consideration of the fine detection capability.

A corresponding general object detection in the working area, where an object is detected, its position and/or its movement trajectory is determined, will now be explained with reference to FIGS. 3a-3d.

Figure 3A:
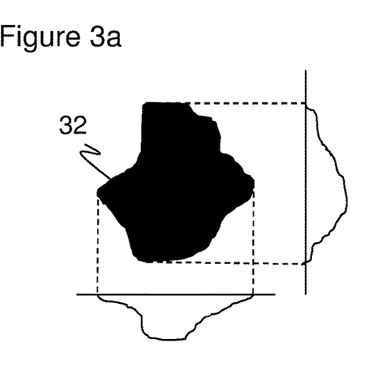
FIG. 3a an explanatory view for the determination of the size of an object based on a row and column projection.

In a first step, the spatial area 12 or the configured working area is examined once with a coarse detection capability and once with a fine detection capability. The coarse detection capability is typically 120-200 mm, the fine detection capability is 20-55 mm or less, the limit being 55 mm. These are only exemplary values, the inventive approach is general. The evaluation results in the positions of the finely and coarsely detected objects for example in a binary map showing all objects whose size match or exceed the respective detection capability. A possible algorithm for this evaluation with a specific detection capability and resulting binary maps is disclosed in EP 2 819 109 A1 mentioned in the introduction, which is hereby incorporated by reference.

As illustrated in FIG. 3a, at first the binary map of the coarse detection capability is evaluated. The image pixels of the binary map which are set (black) designate the coarsely detected objects 32. A simple method for clustering these coarsely detected objects 32 is a determination of the horizontal and vertical projection in the local region. This is done by searching the binary map up to the first object element and the subsequent line-wise and column-wise increase of a counter for the respective index. This is continued line-wise and column-wise until not elements of the binary map in a neighborhood are set. Gaps can be tolerated to some predetermined degree. The first and last positions which are set in the projections illustrated on the right and on the bottom are the outer boundaries of the object.

Figure 3B:
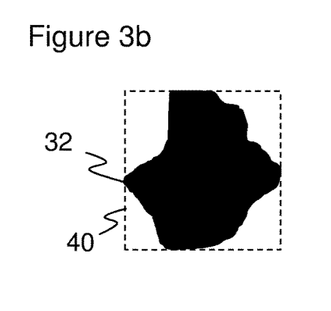
FIG. 3b an exemplary representation of a coarsely detected object with a circumscribing rectangle.

FIG. 3b shows the coarsely detected object 32 obtained by means of column and line projection. Accordingly, a circumscribing rectangle 40 is further processed as the coarsely detected object. More sophisticated methods can also be used to determine a more precise contour or a different circumscribing basic contour, such as an ellipse or the like.

Figure 3C:
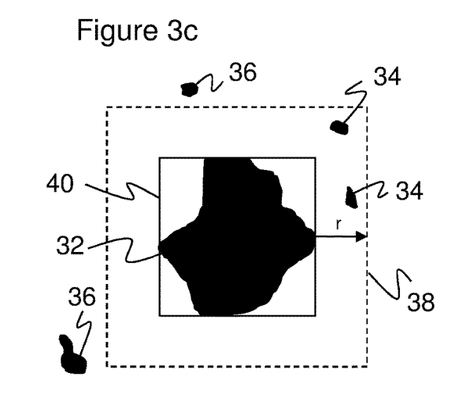
FIG. 3c an exemplary representation of the search area around a coarsely detected object.

FIG. 3c illustrates the search for associated finely detected objects 34 in the vicinity 38 of the coarsely detected object 32 or the circumscribing rectangle 40, respectively. This step for example is done on the binary map of the fine detection capability. In this binary map, the objects of the fine and the coarse detection capability are present. The vicinity 38 is examined up to a search radius or distance r, the calculation of r being discussed in more detail below. The finely detected objects 34 in the vicinity 38 are relevant because it has to be assumed that they belong to the coarsely detected object 32. Finely detected objects 36 outside the vicinity 38, on the other hand, can be ignored as misdetections.

Figure 3D:
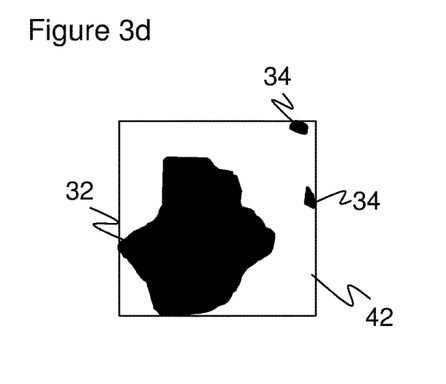
FIG. 3d an exemplary representation of the combination of a coarsely detected object with the finely detected objects in its vicinity.

In FIG. 3d, for simplified further processing, the finely detected objects 34 detected within the environment 38 are added to the coarsely detected object 32. The resulting common contour includes the entire object with all relevant sub-objects 32, 34. A circumscribing object contour 42 can also be formed from the minimum and maximum positions of the object pixels. All considerations regarding the safety distance, in particular coming too close or intruding into a protected field, can now be made on the basis of the fine detection capability and the common object or the circumscribing object contour 42.

Figure 4:
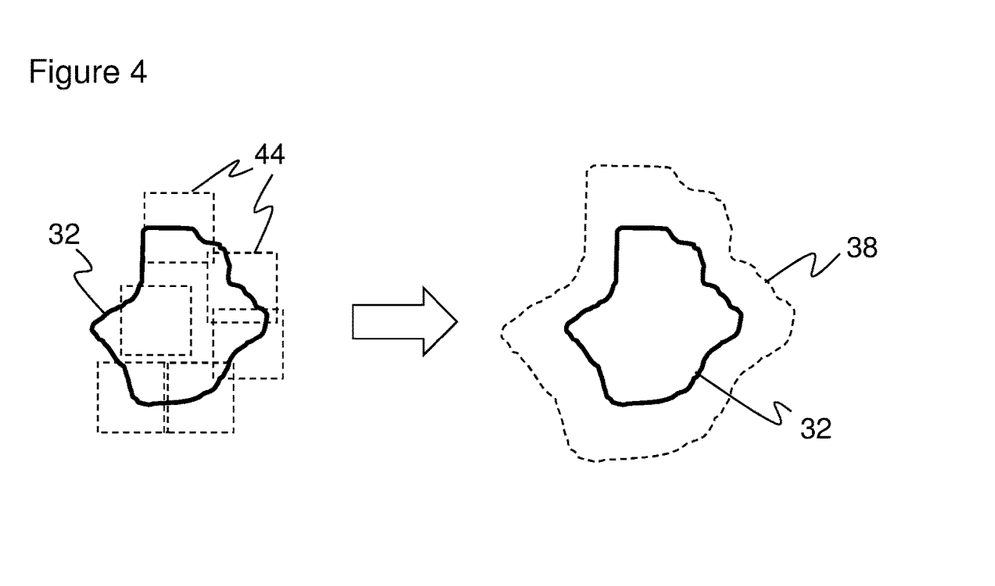
FIG. 4 a representation of an alternative determination of the vicinity using local masks around the image pixels of a coarsely detected object.

Referring now to FIG. 4, an alternative approach for the vicinity search based on masks is explained. The starting point again is an evaluation of the coarse detection capability. From this, all image pixels of coarsely detected objects 32 are known, where FIG. 4 only shows the outer contour for a better representation. A respective mask 44 is set around at least the outer object image pixels, for example in a filter map. The masks 44 may be squares, circles, hexagons, and similar geometric shapes. The size of the mask again corresponds to the search radius r, which is also used in the other alternative according to FIG. 3.

The masks 44 are OR-combined in the filter map. The result is the relevant search area or the vicinity 38, as shown on the right-hand side of FIG. 4. Finely detected objects 34 are located and processed in the vicinity 38 analogously as described with reference to FIG. 3. It is also conceivable to previously simplify the vicinity 38, for example by a circumscribing polygon.

The surrounding region is formed locally, i.e. image-pixel-wise by the masks 44, which is more complex than a one-step definition of the vicinity 38 as in FIG. 3. As a trade-off, the contour of the coarsely detected objects 32 is reproduced more precisely. The two alternative approaches according to FIGS. 3 and 4 are exemplary. There are a number of other possibilities, for example circumscribing polygons or more complex clustering methods.

Figure 5:
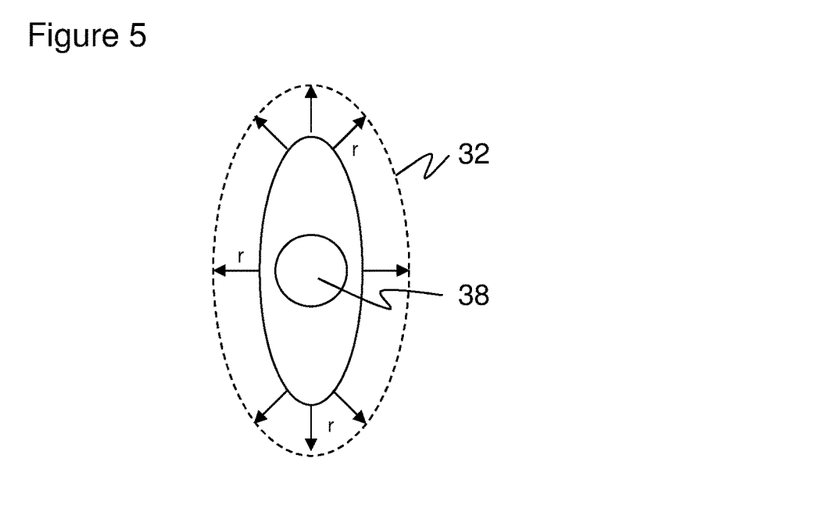
FIG. 5 a representation of the search area around a coarsely detected object for illustrating the calculation of the search radius.

When defining the vicinity 38, a search radius r was used. This is illustrated again in FIG. 5. In order to achieve the highest possible availability, the search radius should be minimized, since all objects in the vicinity 38 defined by r have to be considered. This minimization at the same time has to meet the relevant safety standards. Annex AA of IEC/TS 61496-4-3 contains the requirements for determining the safety distance. The safety distance is determined as $$S_0 = (K \times T) + C + C_{tz} + d,$$

where
$S_0$ is the minimal safety distance to the source of danger,
C is a margin depending on the detection capability, $C = f(d)$,
$C_{tz}$ is a margin for system tolerances,
d is the detection capability, and
$K \times T$ is a term of the movement.
This results in the coarse detection capability $$S_1 = (K \times T) + C_1 + C_{tz} + d1$$

and correspondingly in the fine detection capability $$S_2=(K \times T)+C_2+C_{tz}+d2.$$

The term of the movement K×T can be eliminated for the determination of the search radius r because the consideration is not about reaching the source of danger 26 and a safety distance from the source of danger 36, but the derivation of a search radius in a momentary view.

Thus it generally holds for S that $$S=C+C_{tz}+d.$$

The standard assumes that the safety distance includes a detection capability d to trigger the sensor. Since, however, the outer edge is located, this d is eliminated.

For further simplification, the measurement error, that is, the margin for system tolerances, can be assumed to be the same for both detection capacities, so that it holds that $$S_1=C_1$$

$$S_2=C_2$$

Therefore, the search radius is $$r=C_1-C_2.$$

C is to be set according to the standard in dependence on the detection capability. For example, with a fine detection capability of 55 mm and a coarse detection capability of more than 70 mm, the minimal search radius r=462 mm.

There are some final remarks regarding an edge problem. The invention can in principle be used with conventional protection fields 28. However, there is a difficulty at the edge of the monitored protection field, because the limits of the minimum safety distance of a protection field 28 depend on the detection capability. This is smaller for fine detection capability than for coarser detection capability. However, the advantage to decide about the relevance of detected objects in the fine detection capability based on the coarse detection capability should not be lost. This can easily be resolved in that the outer edge for the evaluation with the coarse detection capability is minimally extended by the search radius plus the coarse detection capability and minus the fine detection capability: Extension=r+$d_1$−$d_2$. A protection field 28 of the coarse detection capability thus is at least as large as a protection field 28 of the fine detection capability. A shutdown of the machine depends on a relevant object detected in the protection field 28 of the fine detection capability.

The invention claimed is:

1. An optoelectronic sensor (10) for safe detection of objects (32, 34) within a monitoring area (12) and having at least a predetermined minimum size the optoelectronic sensor comprising:
   an image sensor (16*a-b*) for acquiring image data of the monitoring area (12); and
   an evaluation unit (24) configured to detect, in the image data, both finely detected objects (34, 36) with a fine detection capability and coarsely detected objects (32) with a coarse detection capability, the coarse detection capability being coarser than the fine detection capability, to determine a search area with a specified distance around a geometric shape as a search range vicinity, and to ignore finely detected objects (36) not in the search range vicinity (38) of a coarsely detected object (32).

2. The sensor (10) according to claim 1,
   wherein the evaluation unit (24) is configured to form a common object (42) from a coarsely detected object (32) and finely detected objects (34) in its vicinity (38).

3. The sensor (10) according to claim 1,
   wherein the sensor (10) is a 3D camera which detects a depth map as image data by means of its image sensor (16*a-b*).

4. The sensor (10) according to claim 1,
   wherein the fine detection capability enables leg detection, arm detection, hand detection, or finger detection, and wherein the coarse detection capability enables body detection, leg detection, or arm detection.

5. The sensor (10) according to claim 1,
   wherein the fine detection capability is 14 mm, 20 mm, 40 mm, or 55 mm, and wherein the coarse detection capability is 70 mm, 120 mm, 150 mm, or 200 mm.

6. The sensor (10) according to claim 1,
   wherein the evaluation unit (24), when locating finely detected objects (34) in the search range vicinity (38) of a coarsely detected object (32), at first defines a circumscribing geometric shape (40) for the coarsely detected object (32) and then determines a search area (38) with a specified distance (r) around the geometric shape (40) as the search range vicinity (38).

7. The sensor (10) according to claim 6,
   wherein the geometric shape (40) is a circle, a rectangle, a hexagon, or another polygon.

8. The sensor (10) according to claim 6,
   wherein the specified distance (r) is derived from safety margins ($C_1$, $C_2$) in dependence on a detection capability as defined in safety standards.

9. The sensor (10) according to claim 8,
   wherein the safety standard is ISO 13855, IEC 61496, or a relevant equivalent.

10. The sensor (10) according to claim 8,
    wherein the specified distance (r) is derived from a difference of the safety margin ($C_1$) in dependence on the coarse detection capability minus the safety margin ($C_2$) in dependence on the fine detection capability.

11. The sensor according to claim 1,
    wherein the evaluation unit (24), when locating finely detected objects (34) in the search range vicinity (38) of a coarsely detected object (32), places a mask (44) having a geometric shape with the size of a specified distance (r) at each image pixel of the coarsely detected object (32), and thus a sum of the masks (44) determines the search range vicinity (38).

12. The sensor (10) according to claim 11,
    wherein the geometric shape (40) is a circle, a rectangle, a hexagon, or another polygon.

13. The sensor (10) according to claim 11,
    wherein the specified distance (r) is derived from safety margins ($C_1$, $C_2$) in dependence on a detection capability as defined in safety standards.

14. The sensor (10) according to claim 13,
    wherein the specified distance (r) is derived from a difference of the safety margin ($C_1$) in dependence on the coarse detection capability minus the safety margin ($C_2$) in dependence on the fine detection capability.

15. The sensor (10) according to claim 1,
    wherein the evaluation unit (24) is configured to evaluate whether a detected object (32, 34, 42) is located within a predefined protection field (28) or too close to a source of danger (26), and to output a safety-related shutdown signal via a safe output (30) in this case.

16. The sensor (10) according to claim 15,
    wherein the evaluation unit (24) is configured to evaluate different protection fields (28) for the coarse detection capability and the fine detection capability in that the protection field (28) is enlarged by a safety extension for the coarse detection capability.

17. A method for safe detection of objects (32, 34) within a monitoring area (12) and having at least a predetermined minimum size, the method comprising:

acquiring and evaluating image data to detect, in the image data, both finely detected objects (34, 36) with a fine detection capability and coarsely detected objects (32) with a coarse detection capability, the coarse detection capability being coarser than the fine detection capability, and determine a search area with a specified distance around a geometric shape as a search range vicinity; and ignoring finely detected objects (36) not in the search range vicinity (38) of a coarsely detected object (32).

18. The method according to claim 17, wherein a common object (40) is formed from a coarsely detected object (32) and finely detected objects (34) in its vicinity (38), and wherein it is evaluated whether the common object (40) intrudes into a protection field (28) or is located too close to a source of danger (26).

19. The method according to claim 17, wherein the search range vicinity (38) is defined by a specified distance (r) with respect to each image pixel of a coarsely detected object (32) or a circumscribed geometric shape (40) of the coarsely detected object (32).

20. The method according to claim 19, wherein the specified distance (r) is derived from safety margins ($C_1$, $C_2$) in dependence on a detection capability as defined in safety standards.

* * * * *